(12) United States Patent
Choi et al.

(10) Patent No.: US 12,108,163 B2
(45) Date of Patent: Oct. 1, 2024

(54) DEVICE OF PHOTOGRAPHING ULTRA-HIGH-SPEED SEQUENTIAL IMAGES

(71) Applicant: JEJU NATIONAL UNIVERSITY INDUSTRY-ACADEMIC COOPERATION FOUNDATION, Jeju-si (KR)

(72) Inventors: Min Joo Choi, Jeju-si (KR); Jong Min Kim, Daegu (KR); Gwan Suk Kang, Jeju-si (KR)

(73) Assignee: Jeju National University Industry—Academic Cooperation Foundation, Jeju-si (KR)

( * ) Notice: Subject to any disclaimer, the term of this patent is extended or adjusted under 35 U.S.C. 154(b) by 0 days.

(21) Appl. No.: 17/790,704

(22) PCT Filed: Jan. 3, 2020

(86) PCT No.: PCT/KR2020/000137
§ 371 (c)(1),
(2) Date: Jul. 1, 2022

(87) PCT Pub. No.: WO2021/137344
PCT Pub. Date: Jul. 8, 2021

(65) Prior Publication Data
US 2023/0055002 A1    Feb. 23, 2023

(51) Int. Cl.
*H04N 23/74*  (2023.01)
*H04N 23/10*  (2023.01)
*H04N 23/56*  (2023.01)

(52) U.S. Cl.
CPC ............ *H04N 23/74* (2023.01); *H04N 23/10* (2023.01); *H04N 23/56* (2023.01)

(58) Field of Classification Search
CPC ........ H04N 23/74; H04N 23/10; H04N 23/56; H04N 23/125
See application file for complete search history.

(56) References Cited

U.S. PATENT DOCUMENTS 8,854,472 B1 * 10/2014 Nagamune ................ G01J 3/51
250/341.8
2008/0212069 A1    9/2008 Goldberg et al.
(Continued)

FOREIGN PATENT DOCUMENTS

JP        2015041784 A      3/2015
KR    1020070039971 A      4/2007
(Continued)

*Primary Examiner* — Padma Haliyur
(74) *Attorney, Agent, or Firm* — Rabin & Berdo, P.C.

(57) ABSTRACT

A sequential image photographing device for photographing sequential images of an object to be observed includes: an illuminating unit configured to sequentially irradiate a plurality of light having different wavelength bands to the object; a digital camera configured to photograph the object illuminated by the plurality of the light emitted from the illuminating unit; a controller controlling the illuminating unit and the digital camera; and an image processing unit configured to extract a plurality of channel images corresponding to the respective wavelength band from the image photographed by the digital camera and to obtain the sequential images of the object.

4 Claims, 4 Drawing Sheets

(56) References Cited

U.S. PATENT DOCUMENTS

| | | | | |
|---|---|---|---|---|
| 2012/0127543 A1* | 5/2012 | Okada | ............... | H04N 1/0446 |
| | | | | 358/475 |
| 2016/0248971 A1* | 8/2016 | Tall | ............... | G06V 10/141 |
| 2016/0360125 A1* | 12/2016 | Yamamoto | ............... | G02B 21/365 |
| 2018/0020143 A1* | 1/2018 | Funamizu | ............... | H04N 25/50 |
| 2018/0180534 A1* | 6/2018 | Noda | ............... | G06T 7/0004 |
| 2019/0109984 A1* | 4/2019 | Good | ............... | H04N 1/484 |
| 2020/0400826 A1* | 12/2020 | Talbert | ............... | H04N 23/74 |
| 2023/0077148 A1* | 3/2023 | Yamamoto | ............... | H04N 1/04 |

FOREIGN PATENT DOCUMENTS

| | | |
|---|---|---|
| KR | 1020130121224 A | 11/2013 |
| KR | 1020170131084 A | 11/2017 |
| KR | 1020190038083 A | 4/2019 |
| KR | 102100229 B1 | 4/2020 |

* cited by examiner

DEVICE OF PHOTOGRAPHING ULTRA-HIGH-SPEED SEQUENTIAL IMAGES

TECHNICAL FIELD

The present invention relates to a device capable of photographing a series of sequential images of an object or a phenomenon, and more particularly to a device capable of photographing a series of sequential images of an object or a phenomenon at very short time intervals.

BACKGROUND ART

In order to photograph an object moving very fast or an object rapidly changing, an ultra-high-speed sequential image photographing device is used. In general, photographing of ultra-high-seed images is performed by irradiating high-intensity light onto to an object and photographing images using a camera having a high speed sequential photographing function. Such an ultra-high-speed sequential image photographing device may acquire sequential images at an ultra-high speed, for example, at intervals of several microseconds (µs).

However, such a conventional ultra-high-speed image photographing device is very expensive and has a limited maximum number of obtainable frames. In addition, there is a problem in that the image size is limited or reduced when photographing at the maximum speed using the conventional ultra-high-speed image photographing device.

Meanwhile, a method of capturing a high-speed still image is used as a method of acquiring an instantaneous still image of an ultra-high-speed phenomenon. In the technique of capturing the high-speed still image, short-pulse light lasting for a very short period of time (e.g., microseconds or less) passes through a light diffuser and then irradiates an object to be photographed and this is photographed a general camera with a relatively long exposure compared to the irradiation time of light.

Although this high-speed still image capturing method can obtain high-resolution instantaneous still images with a low-cost general camera, it has a limitation in that sequential image acquisition is impossible.

Prior art document: Korean Patent publication No. 10-2013-0121224

DETAILED DESCRIPTION OF THE INVENTION

Technical Object

An object of the present invention is to provide an ultra-high-seed sequential image photographing device using a general camera obtaining a series of instantaneous images of an object moving or changing at a very high speed.

Technical Solution

According to an embodiment of the present invention, a sequential image photographing device for photographing sequential images of an object to be observed includes: an illuminating unit configured to sequentially irradiate a plurality of light having different wavelength bands to the object; a digital camera configured to photograph the object illuminated by the plurality of the light emitted from the illuminating unit; a controller controlling the illuminating unit and the digital camera; and an image processing unit configured to extract a plurality of channel images corresponding to the respective wavelength band from the image photographed by the digital camera and to obtain the sequential images of the object.

The controller may control the illuminating unit to irradiate sequentially the plurality of the lights for a predetermined irradiation time with a predetermined delay time.

The predetermined delay time may be greater than the predetermined irradiation time.

The controller may control to photograph a single image visualized by an illumination during a time period from a start time point of the light firstly irradiated among the plurality of lights to an end time point of the light last irradiated among the plurality of lights.

The plurality of the lights may include a red light, a green light and a blue light.

The digital camera may include an image sensor having a plurality of pixels, and the respective pixels may include respectively a plurality of color elements that have the highest sensitivity selectively to the plurality of the lights.

Effect of the Invention

According to the present invention, a single photographed image is obtained by photographing an object using a digital camera while sequentially irradiating a plurality of lights having different wavelength bands and a plurality of channel images respectively responding to the lights therefor, so a series of sequential images of the object can be obtained. Accordingly, high-speed sequential images can be obtained using a normal digital camera.

BEST MODE FOR CARRYING OUT THE INVENTION

An embodiment of the present invention will be described in detail with reference to the accompanying drawings.

A sequential image photographing device according to an embodiment of the present invention is a device configured to photograph a series of sequential images according to time sequence of a photographed object such as an object or a phenomenon (e.g., a bubble in a liquid formed by focused ultrasound).

Figure 1:
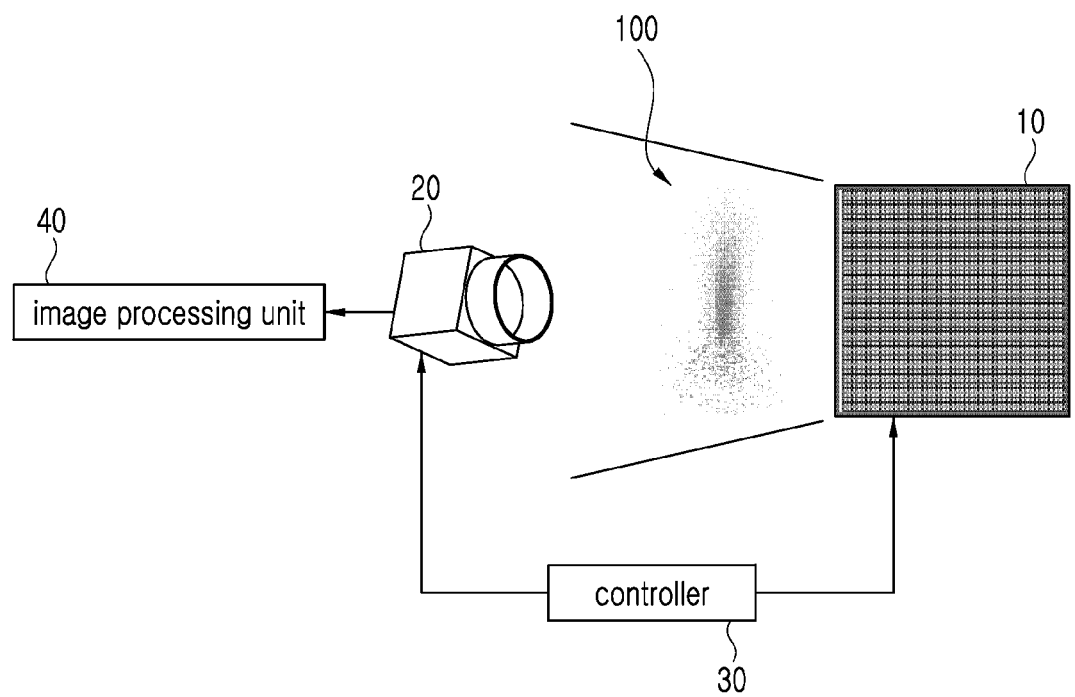
FIG. 1 is a schematic block diagram of a device of photographing ultra-high-speed sequential images according to an embodiment of the present invention.

Referring to FIG. 1, a sequential image photographing device according to an embodiment of the present invention includes an illuminating unit 10, a digital camera 20, a controller 30 and an image processing unit 40. For example, the digital camera 20 may be a color digital camera that captures a color image, for example, a CMOS type digital camera or a CCD type digital camera. However, the digital camera 20 of the embodiment of the present invention is not limited to a digital camera including three sensors in one pixel, that is, R, G and B sensors, unlike a conventional digital camera, and may be a color digital camera including a plurality (e.g., N) of sensors that are selectively sensitive to a plurality of light sources of multiple wavelength bands.

The illuminating unit 10 may be implemented as a known lighting device capable of generating and emitting light of different wavelength bands and may be configured to sequentially irradiate a plurality of lights having different wavelength bands to an object 100 to be photographed.

The color digital camera 20 photographs the photographed object 100 that is illuminated by the light emitted from the illuminating unit 10.

The controller 30 controls the operations of the illuminating unit 10 and the color digital camera 20 and may be signally connected to the illuminating unit 10 and the color digital camera 20 so as to output control signals to the illuminating unit 10 and the color digital camera 20. It may include a microprocessor for executing an algorithm for a sequential image photographing to be described below and may include various software and hardware for implementing sequential image photographing.

The image processing unit 40 extracts a plurality of channel images corresponding to the respective wavelength bands of the plurality of lights output by the lighting unit 10 from the image photographed by the color digital camera 20 and thereby obtain sequential images of the photographed object. That is, according to an embodiment of the present invention, the illuminating unit 10 sequentially irradiates a plurality of lights having different wavelength bands and the color digital camera 20 generates color images of the photographed object 100 while a plurality of lights having different wavelength bands is irradiated, and the image processing unit 40 extracts a plurality of channel images corresponding to the respective wavelength bands from the color images transmitted from the color digital camera 20. At this time, the illuminating unit 10 sequentially irradiates a plurality of lights having different wavelength bands at a very short time interval, for example, several nanoseconds (ns) intervals, and the image processing unit 40 extracts images corresponding to the respective wavelength band from the single color image photographed during the process. The extracted images for each channel become images for each time period of the photographed object 100, and thus these constitute a series of sequential images. Hereinafter, this will be described in more detail.

Figure 2:
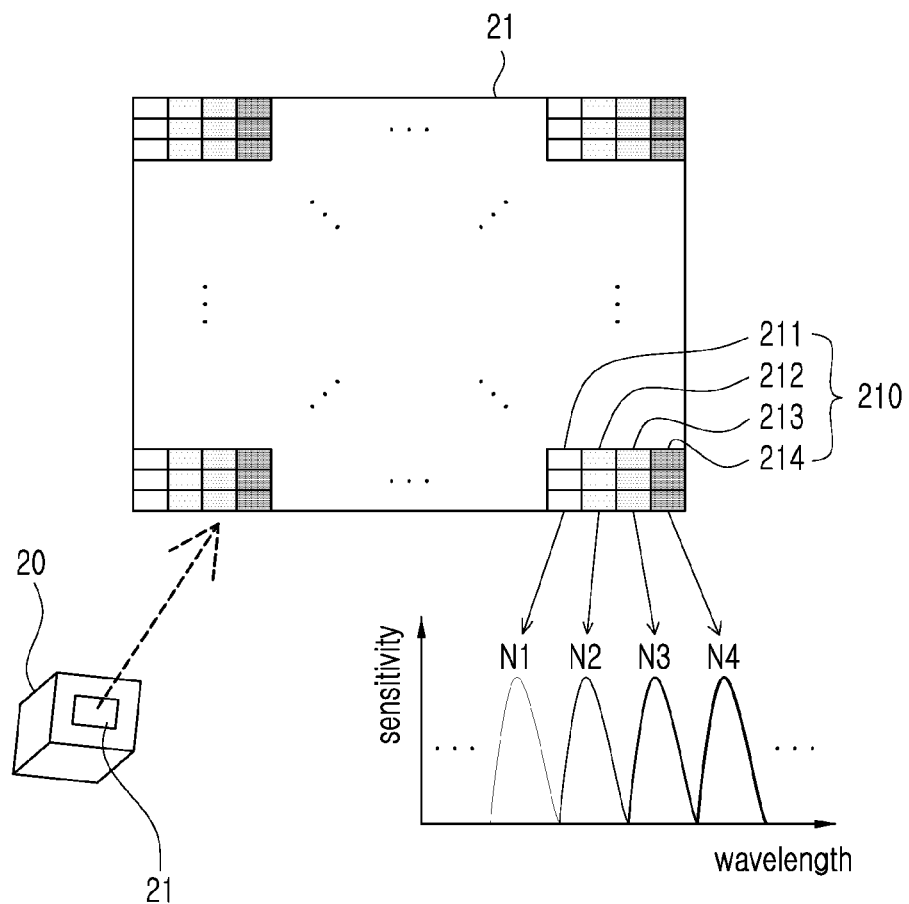
FIG. 2 is a view for explaining color elements of pixels of an image sensor of a digital camera of a sequential image photographing device according to an embodiment of the present invention.

Referring to FIG. 2, the image sensor 21 of the color digital camera 20 includes a plurality of pixels 210 and includes a plurality of color elements 211, 212, 213 and 214 of each pixel 210. In the drawing, a case in which four color elements 211, 212, 213 and 214 are provided is illustrated as an example, but the number of color elements is not limited thereto and may be any plurality. In this case, the color elements 211, 212, 213 and 214 may be provided with the same number of the plurality of lights of different wavelength bands sequentially irradiated by the illuminating unit 10, and the individual color elements 211, 212, 213 and 214 may be matched to have the greatest sensitivity selectively to the wavelength bands of the individual lights emitted by the illuminating unit 10. For example, when the illuminating unit 10 sequentially irradiates lights N1, N2, N3 and N4 of different wavelength bands, the color element indicated by reference numeral 211 may have the greatest sensitivity to the wavelength band of N1 light, the color element 212 may have the greatest sensitivity to the wavelength band of N2 light, the color element 213 may have the greatest sensitivity to the wavelength band of N3 light, and the color element 214 may have the greatest sensitivity to the wavelength band of N4 light.

Figure 3:
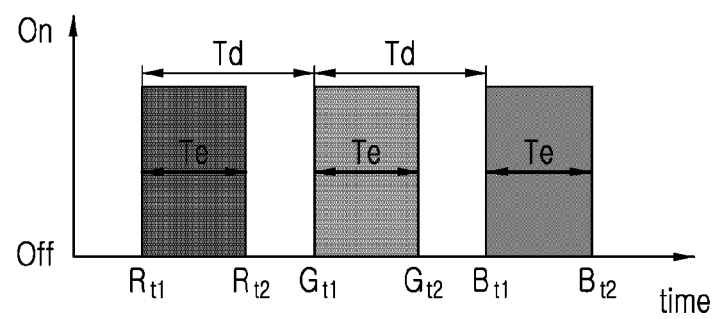
FIG. 3 is a view for explaining output of a plurality of lights by an illuminating unit in a sequential image photographing device according to an embodiment of the present invention.

The controller 30 controls the illuminating unit 10 to sequentially irradiate a plurality of lights with a predetermined delay time, and individual lights may be controlled to be irradiated for a predetermined irradiation time. FIG. 3 exemplarily shows a case in which three lights having different wavelength bands, i.e., red light, green light and blue light are sequentially irradiated, and each light is irradiated for a predetermined irradiation time Te, and each Irradiation of light is started with a predetermined delay time Td from the start point of the previous light irradiation. At this time, since the predetermined delay time Td is set to be greater than the predetermined irradiation time Te, irradiation of each light may be performed independently without overlapping with each other. Thereby, clearer sequential images can be obtained.

Figure 4:
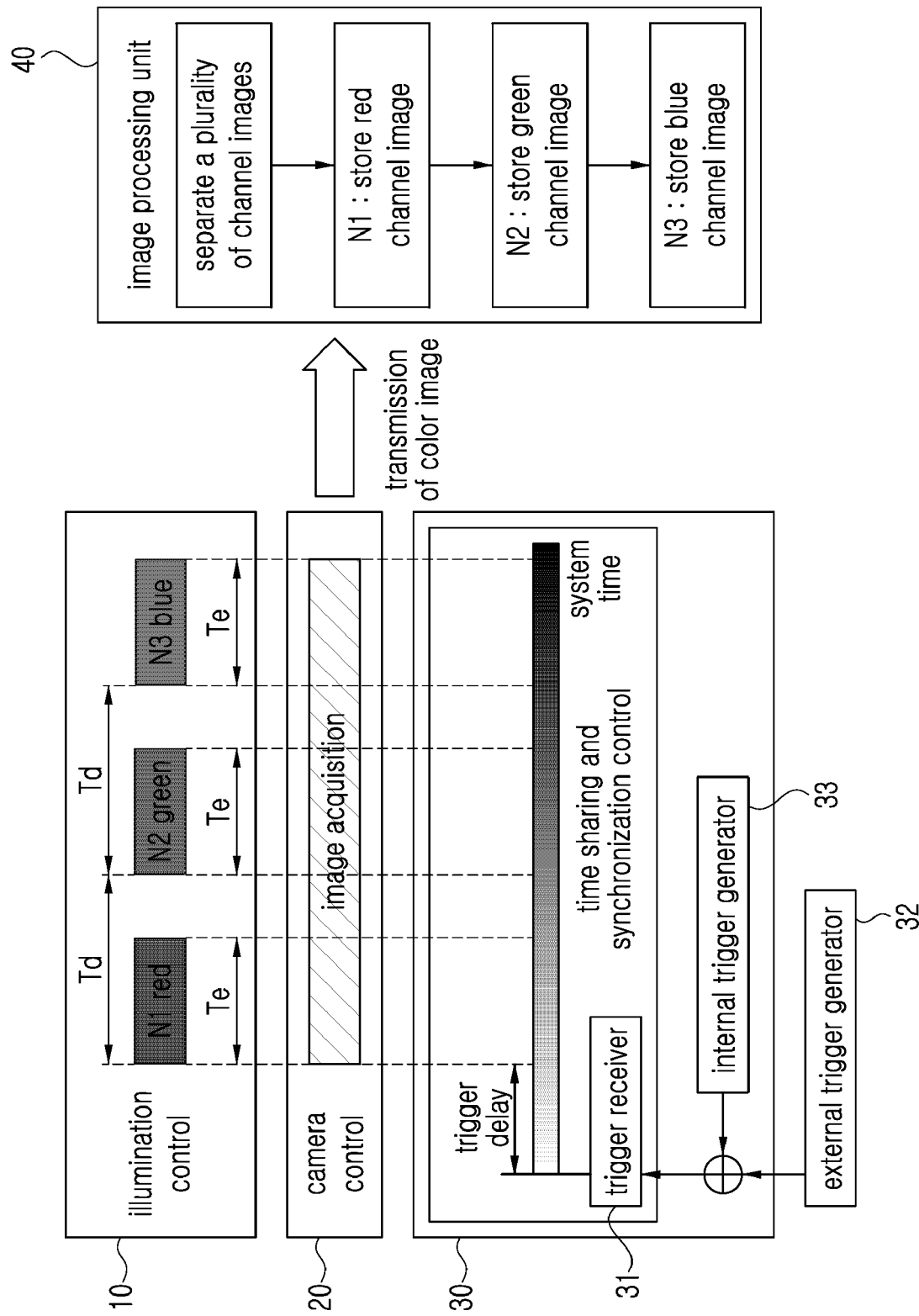
FIG. 4 is a view for explaining a control process by a sequential image photographing device according to an embodiment of the present invention.

Specifically, referring to FIG. 4, if a trigger receiving unit 31 receives a trigger signal from an external trigger generator 32 or an internal trigger generator 33, the controller 30 controls the time sharing and synchronization control of the illuminating unit 10 and the color digital camera 20. As described above, the controller 30 controls the illuminating unit 10 to sequentially irradiate the three lights N1, N2 and N3 and also controls the color digital camera 20 through synchronization. Specifically, the controller 30 performs the illuminating control such that the three lights N1, N2 and N3 are sequentially irradiated for a predetermined irradiation time Te with a predetermined delay time Td, and performs the camera control such that the color digital camera 20 photographs one color image for a time period from the irradiation start time point of the light N1, which is first irradiated, to the irradiation end time point of the light N3, which is last irradiated. Accordingly, a single color image is captured while lights of different wavelength bands are sequentially irradiated.

Figure 5:
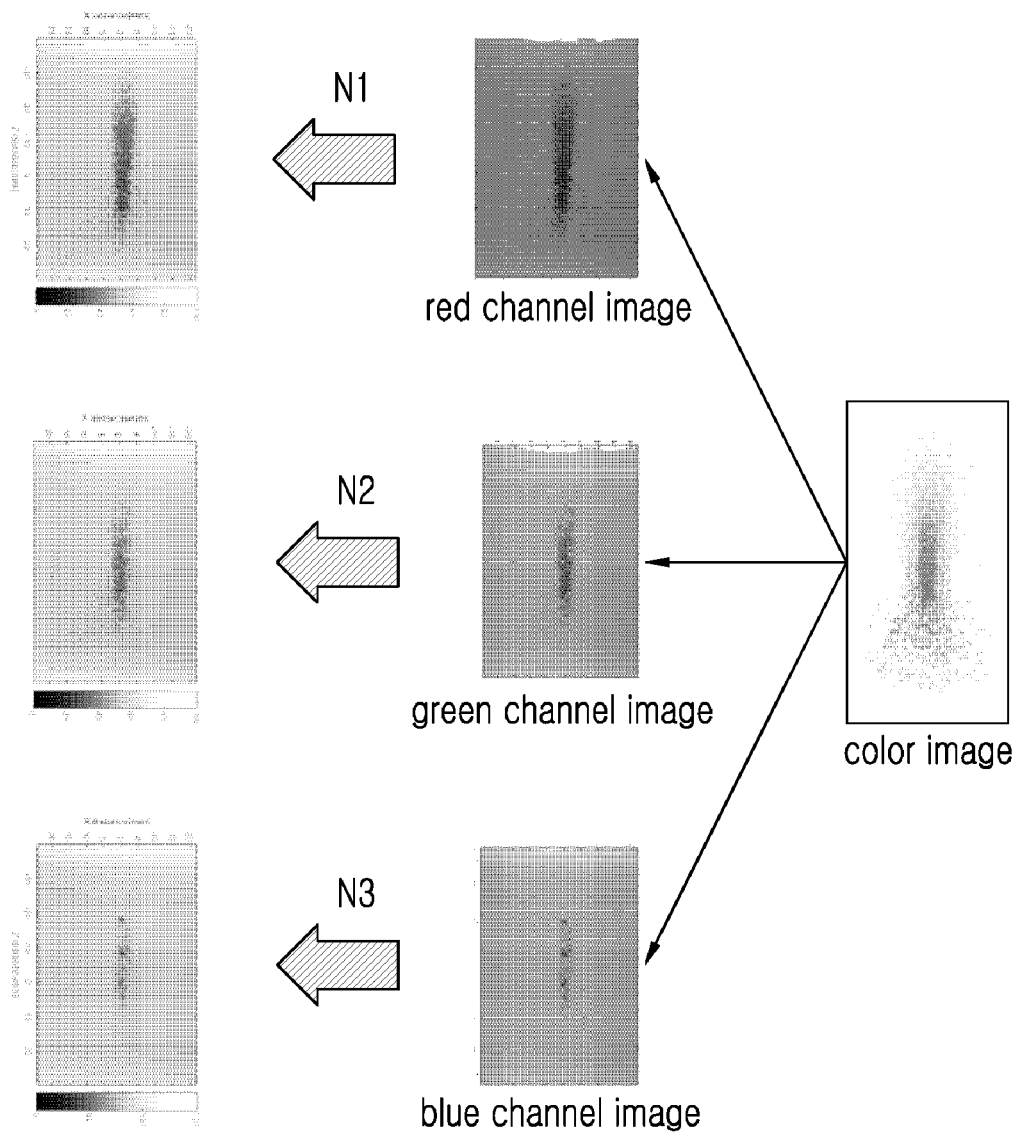
FIG. 5 is a view for explaining acquisition of a series of sequential images by an image processing unit of a sequential image photographing device according to an embodiment of the present invention.

Then, the controller 30 transmits the photographed color image to the image processing unit 40. The image processing unit 40 separates a plurality of channel images respectively corresponding to different wavelength bands of a plurality of lights from the photographed image. That is, as shown in FIG. 5, the image processing unit 40 may separate the photographed single color image into a red channel image, a green channel image and a blue channel image and store these images as an image corresponding to each light. For example, each color channel image may be separated from a color image using a MATLAB image processing program. The plurality of channel images obtained in this way becomes a series of sequential images of the object to be photographed. For example, referring to FIG. 5, color image information is stored in the form of multiple arrangements describing pixel information for each light source, that is, pixel values for each channel, and the information in each arrangement may be an image for each light source.

According to an embodiment of the present invention, one photographed image is acquired by photographing an object with a color digital camera while sequentially irradiating a plurality of lights having different wavelength bands, and a plurality of channel images corresponding to each light are separated therefrom to obtain a series of sequential images. Accordingly, it is possible to acquire high-speed sequential images using a normal color digital camera.

Although preferred embodiments of the present invention have been described in detail above, the scope of the present invention is not limited thereto, and various modifications and improvements by those skilled in the art using the basic concept of the present invention as defined in the following claims are also within the scope of the invention.

INDUSTRIAL APPLICABILITY

The present invention relates to an image photographing device and can be applied to an image photographing device, so it has an industrial applicability.

The invention claimed is:

1. A sequential image photographing device for photographing sequential images of an object to be observed, comprising:
   an illuminating unit configured to sequentially irradiate a plurality of lights having different wavelength bands to the object;
   a digital camera configured to photograph the object illuminated by the plurality of the lights emitted from the illuminating unit;
   a controller controlling the illuminating unit to irradiate sequentially the plurality of the lights for a predetermined irradiation time with a predetermined delay time and controlling the digital camera to photograph a single image visualized by an illumination during a time period from a start time point of a light first irradiated among the plurality of lights to an end time point of a light last irradiated among the plurality of lights; and
   an image processing unit configured to extract a plurality of channel images corresponding to a respective wavelength band from the single image photographed by the digital camera and to obtain the sequential images of the object.

2. The sequential image photographing device of claim 1, wherein the predetermined delay time is greater than the predetermined irradiation time.

3. The sequential image photographing device of claim 1, wherein the plurality of the lights comprises a red light, a green light and a blue light.

4. The sequential image photographing device of claim 1, wherein the digital camera comprises an image sensor having a plurality of pixels, and wherein respective pixels comprise respectively a plurality of color elements that have the highest sensitivity selectively to the plurality of the lights.

* * * * *